May 25, 1965 D. H. McHUGH 3,185,761

FABRICATED CIRCUIT STRUCTURE

Filed Feb. 12, 1963 5 Sheets-Sheet 1

INVENTOR.
DONALD H. McHUGH.
BY
Wallace P. Lamb
ATTORNEY.

May 25, 1965 D. H. McHUGH 3,185,761

FABRICATED CIRCUIT STRUCTURE

Filed Feb. 12, 1963 5 Sheets-Sheet 2

INVENTOR.
DONALD H. McHUGH.
BY
Wallace P. Lamb
ATTORNEY.

INVENTOR.
DONALD H. Mc HUGH.
BY
Wallace P. Lamb
ATTORNEY.

INVENTOR.
DONALD H. McHUGH.
BY
Wallace P. Lamb
ATTORNEY.

INVENTOR.
DONALD H. McHUGH.
BY
Wallace P. Lamb
ATTORNEY.

United States Patent Office 3,185,761
Patented May 25, 1965

3,185,761
FABRICATED CIRCUIT STRUCTURE
Donald H. McHugh, Garden City, Mich., assignor to Burroughs Corporation, Detroit, Mich., a corporation of Michigan
Filed Feb. 12, 1963, Ser. No. 258,057
2 Claims. (Cl. 174—68.5)

This invention relates generally to electrical circuit units and particularly to mounting and circuit structures for electronic components and a method of making such structures.

It is an object of the present invention to provide an improved mounting and circuit structure for electronic components.

Another object of the invention is to provide an improved method of making a mounting and circuit structure for electronic components.

Another object of the invention is to provide an improved mounting and electrical circuit structure of a character to facilitate its manufacture and assembly.

Another object of the invention is to provide an improved mounting and electrical circuit structure of a character to facilitate the mounting and connecting of components to mounting terminals of the structure.

A further object of the invention is to provide an improved construction and method of making a mounting and circuit structure to effect an appreciable decrease in the cost of such structures.

Other objects of the invention will become apparent from the following detail description, taken in connection with the accompanying drawings in which.

Figure 1:
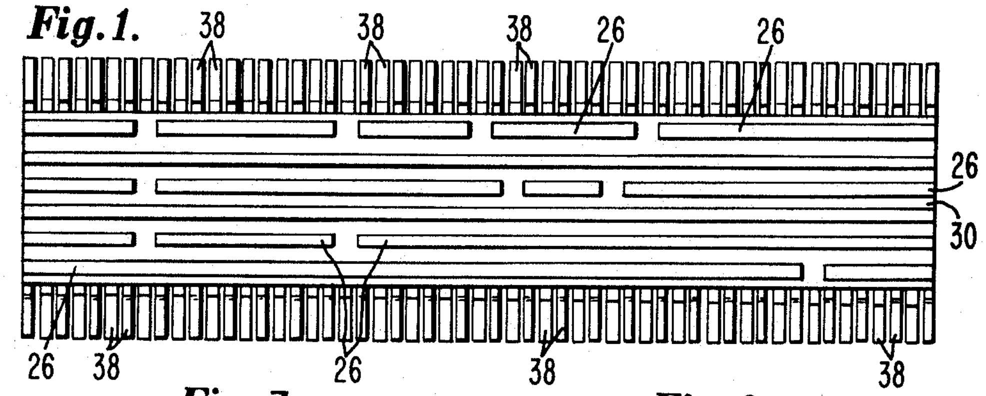
FIG. 1 is a plan view of a mounting and circuit structure embodying features of the invention.
Figures 2, 3, 4:
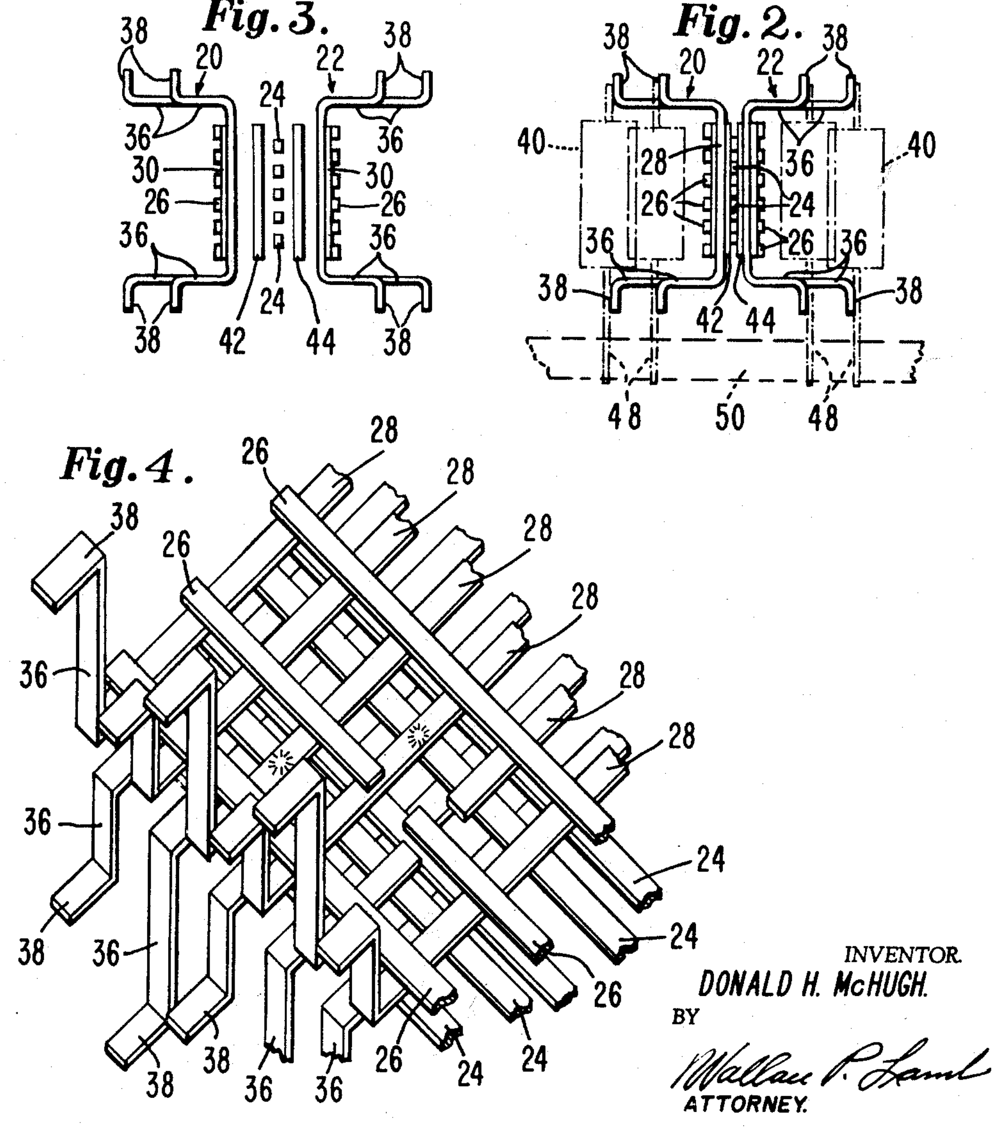
FIG. 2 is an end view.
FIG. 3 is an exploded view.
FIG. 4 is a fragmentary perspective view with certain parts omitted to illustrate details of the circuit structure.
Figures 5, 6:
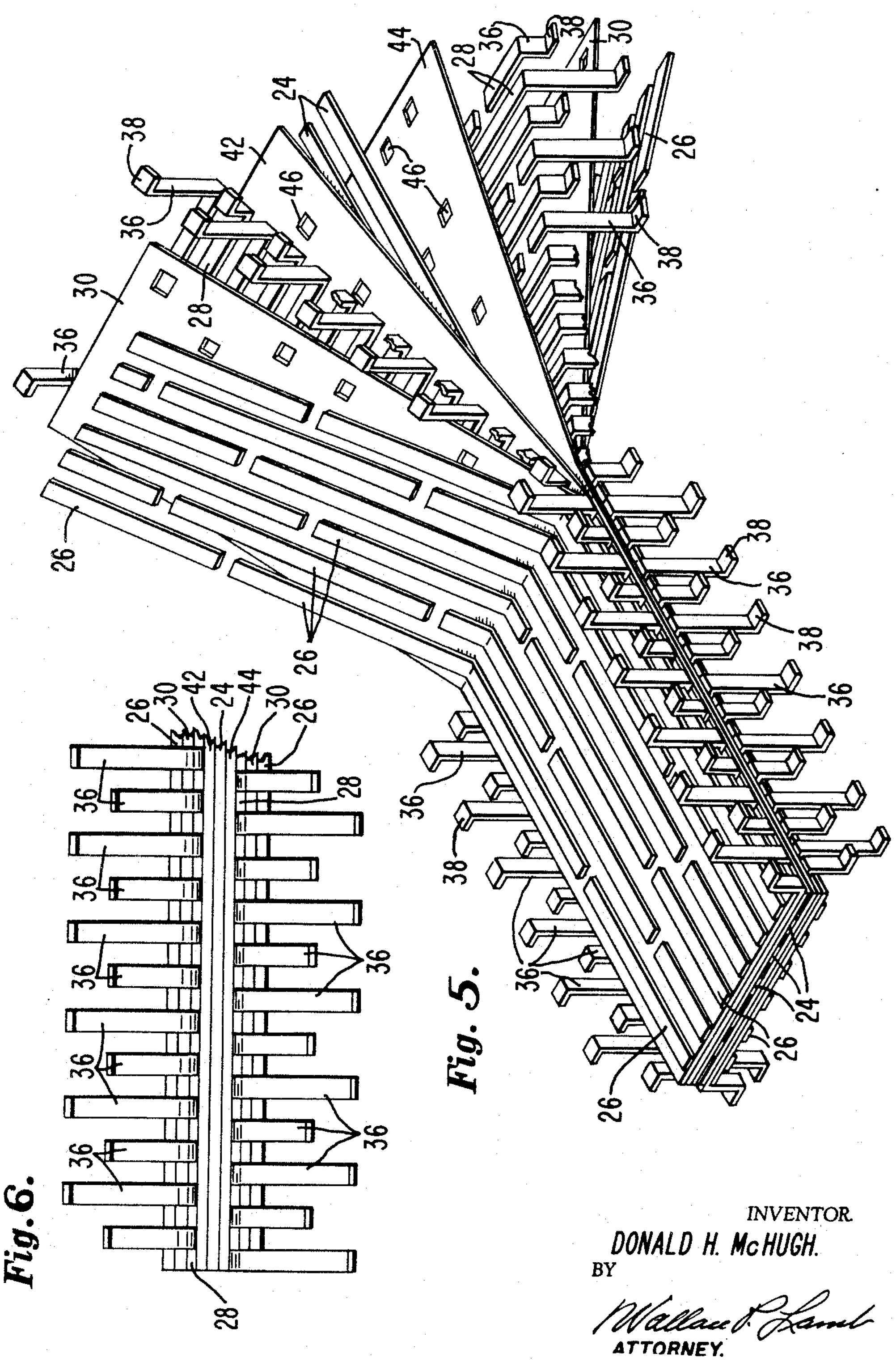
FIG. 5 is another perspective view of the circuit structure.
FIG. 6 is a fragmentary side view.

Referring to the drawings by characters of reference, the mounting and circuit structure shown in FIGS. 1 to 6 comprises, in general, two like circuit units or subassemblies 20 and 22 and a plurality of circuit connector members or busses 24. The units 20 and 22 are arranged in back-to-back relationship with the circuit connectors 24 therebetween and these units are structurally and electrically connected together as a unitary structure.

Figure 9:
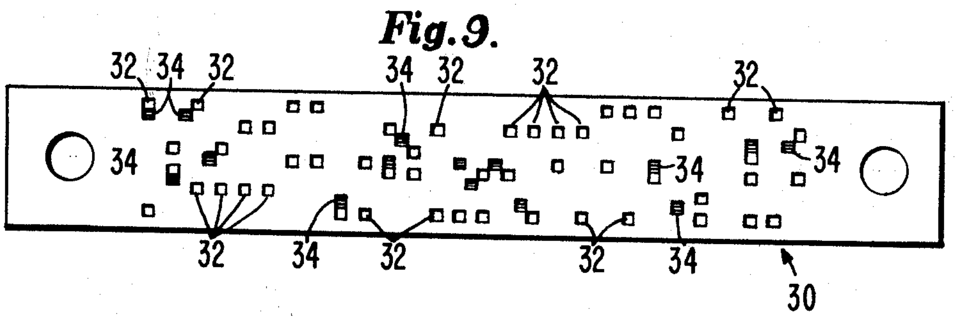
FIG. 9 is a plan view of a sheet of dielectric material.

Each of the sub-assembly units 20 and 22 comprises a plurality of rows of electric conducting elements 26, the rows being laterally positioned and the conducting elements of each row being longitudinally spaced apart. Also, each of the sub-assembly units 20 and 22 comprises a plurality of transversely extending rows of electric conducting elements 28 which lie crosswise of the longitudinal conducting elements 26. Interposed between the longitudinal rows of conductor elements 26 and the transverse rows of conductor elements 28 there is a thin sheet 30 of a suitable dielectric or insulating material, such as Mylar plastic material. The dielectric sheet 30 is punched or otherwise provided with two predetermined patterns of holes 32 and 34, FIG. 9. The holes 32 overlie and align with predetermined ones of the junctions or cross points of the longitudinal and transverse conductor elements 26 and 28. At these junctions the conductor elements are structurally and electrically connected together, such as by welding, the holes 32 providing clearance for making the weld. Preferably, the conductor elements 26 and 28 are connected together by the well known resistance welding process. The other pattern of holes 34 have been shaded in FIG. 9 to distinguish them from the pattern of holes 32 and are clearance holes for a second welding operation hereinafter described in detail.

The conductor elements 26 and 28 and the sheet 30 of dielectric material of each of the sub-assemblies 20, 22 form the web of a channel structure, the sides of which are formed by extended end portions or mounting terminals 36 of the cross conductor elements 28. Preferably, the terminals 36 are provided with outwardly directed flanges 38 on which suitable electronic components 40 may be mounted, the components being located between the sides of the channel circuit structure with their opposite leads respectively welded or otherwise suitably secured to opposite ones of the pairs of terminals 36. In order to provide a compact arrangement of the circuit structure and components 40, I make alternate pairs of the terminals of different lengths so that the components may be arranged in rows of two parallel planes with the components of one row in staggered or offset relationship to the components in the other row, as illustrated, for example, in FIG. 2.

As previously mentioned, the sub-assemblies 20 and 22 are arranged in back-to-back relationship and between the sub-assemblies in broadside relation thereto are the circuit connectors 24 in the form of a plurality of laterally positioned conducting elements or busses which extend longitudinally of the rows of conducting elements 26. The connecting elements 24 are positioned between a pair of thin insulating sheets 42 and 44 of dielectric material which, like the sheets 30, may be Mylar or other suitable insulating material. As is shown more clearly in FIG. 2, the connecting elements 24 are arranged in staggered relationship to the rows of conducting elements 26 so as to overlie directly the rows of cross conducting elements 28. Also, the sub-assemblies 20 and 22 are arranged such that the cross conducting elements 28 of one of them are in staggered relationship to the cross conducting elements 28 of the other. With the parts in the above mentioned staggered relation, certain ones of the cross members 28 of sub-assembly 20 as required to establish the desired circuit are structurally and electrically connected to predetermined ones of the intermediate connector members 24, and the cross members 28 of the sub-assembly 22 are similarly connected to the other of the intermediate connector members 24. Each of the pair of dielectric sheets 42 and 44 are provided with a pattern of clearance holes 46, the patterns of holes 46 and the patterns of holes 34 in the dielectric sheets 30 being alike with corresponding holes in alignment or registerable. Through these holes 34 and 46 gang welding electrodes are receivable to weld the sub-assembly cross members 28 to the intermediate circuit connectors 24, preferably by the well known resistance welding process. The welding operation structurally connects the sub-assemblies 20 and 22 and also electrically connects them together by the connectors 24. The components 40 are then mounted on and have their opposite leads connected to the terminal flanges 38 after which the assembly is potted except for the component terminals 48 which function as connectors for plugging into a main circuit board 50, FIG. 2.

Figure 7:
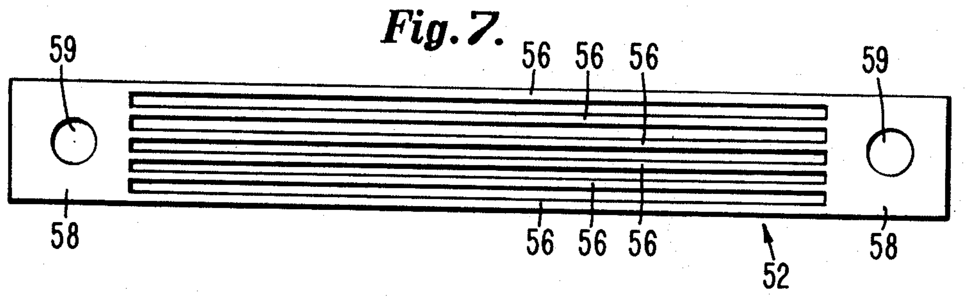
FIGS. 7 and 8 are plan views of metallic grids form which the circuit structure is made.
Figure 8:
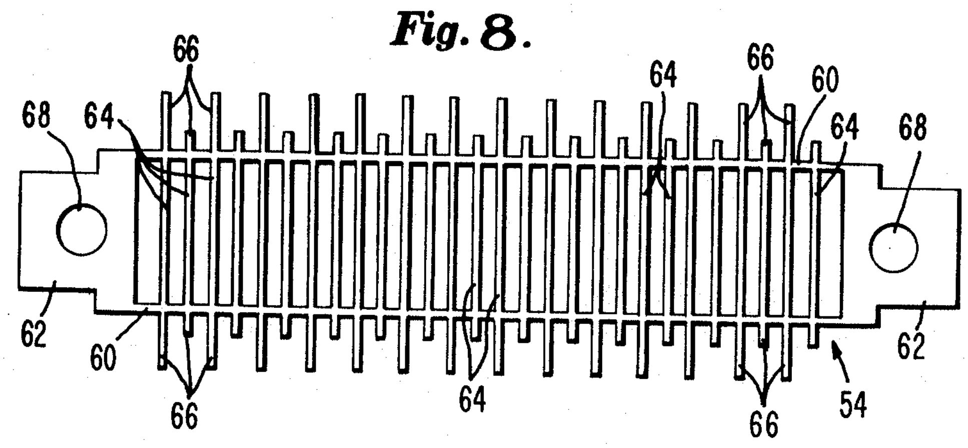
Figure 11:
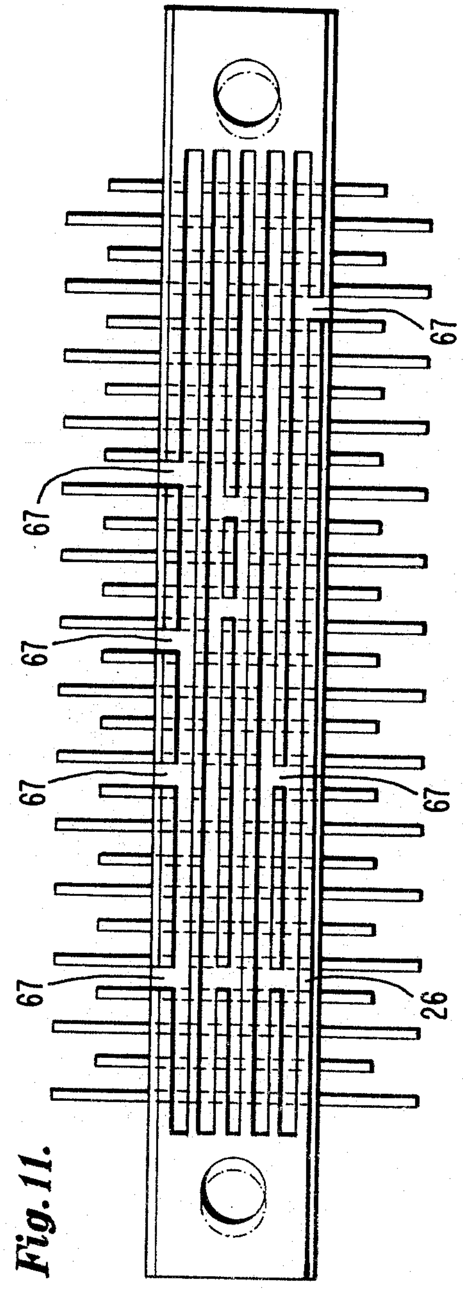
FIG. 11 is an enlarged plan view similar to FIG. 10 and illustrating the circuit structure at another stage of its fabrication.
Figure 13:
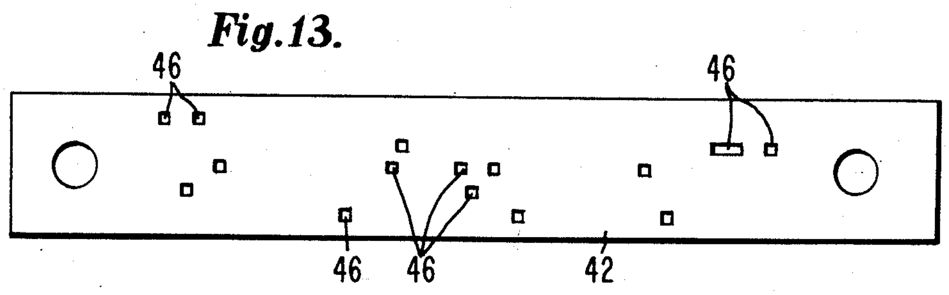
FIGS. 13 and 14 are plan views of like sheets of dielectric material employed in the circuit structure.

In order to make the above described component mounting and circuit structure economically, I provide a method of manufacture which includes the use of metal grids 52 and 54, FIGS. 7 and 8. Each of the sub-assemblies 20, 22 is fabricated of two of the grids 52, 54 and one of the insulating or dielectric sheets 30 illustrated in FIG. 9. The grids 52, 54 may be made of any thin electric conducting sheet metal, such as nickel, and may be formed by a stamping operation, or by an etching process, as desired. The grid 52 is rectangular in shape, as seen in the plan view of FIG. 7, and has longitudinally extending laterally positioned webs 56 joined together by end portions 58. In the opposite end portions 58 of the grid 52 of sub-assembly 20, holes 59 are provided to receive a pair of vertical posts of a holding fixture. The other grid or grid 54 comprises a frame having side members 60 joined together by opposite end portions 62 and by longitudinally spaced apart transverse webs 64. Further, the grid 54 has alternately long and short tabs 66 that are integral with and extend laterally outwardly from the frame sides, the tabs 66 being in alignment respectively with the transverse webs 64. In the web end portions 62, holes 68 are provided to receive the aforementioned vertical posts of a suitable aligning and holding fixture. The two grids 54, of the respective sub-assemblies 20 and 22 are alike with respect to their blank form, but differ in the positioning of the holes 68, as indicated by the holes shown in dot and dash lines in FIG. 11. As shown, the holes in dot and dash lines are spaced apart the same distance as the full line holes 68, but are respectively spaced therefrom, to the left facing FIG. 8, a distance equal to one space distance between the grid webs 64. By this arrangement, it will be seen that if both of the grids 54 of the two sub-assemblies were placed on fixture posts, as hereinafter described in the assembly of the sub-assemblies, it will be apparent that the webs 64 of the two grids 54 will be in longitudinal staggered relationship.

Figure 10:
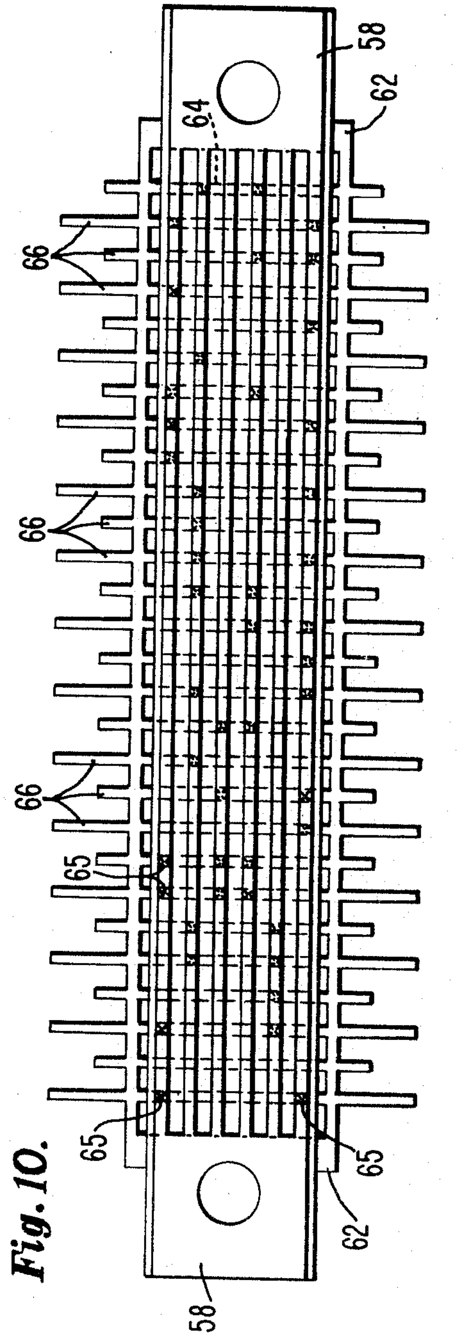
FIG. 10 is an enlarged plan view, illustrating the circuit structure at one stage of its fabrication.

In the assembly of the sub-assembly 20, the grid 54, insulation sheet 30 and grid 52 are stacked on the fixture in the order named so as to be held against relative movement. In this stacked relationship, the longitudinal grid webs 56 and the transverse grid webs 64 will be in cross relationship forming a matrix and the unshaded clearance holes 32 will overlie and align with certain predetermined junctions or cross points of the webs 56 and 64. The next step is to apply resistance welding electrodes at the location of the clearance holes 32 and weld the grids together at the junctions of the webs 56 and 64 as at 65, FIG. 10, which structurally joins the grids together and holds the insulation sheet 30 therebetween. The next step of the method is to break away unwanted portions of the grid webs 56, 64 as at 67, FIG. 11, to isolate the desired circuit, the unwanted portions including portions of the frame sides 60. This breaking away of the frame sides leaves the tabs 66 as end extended portions which are then bent up to form the sides of a channel-like electrical circuit structure of which the grids 52, 64 and insulation 30 form the webs. Preferably, the breaking away of the unwanted portions of the grids 52 and 54 to isolate the desired circuit is preformed by a gang punch operation. The other sub-assembly 22 is assembled by the same method described above to assemble sub-assembly 20.

Figure 12:
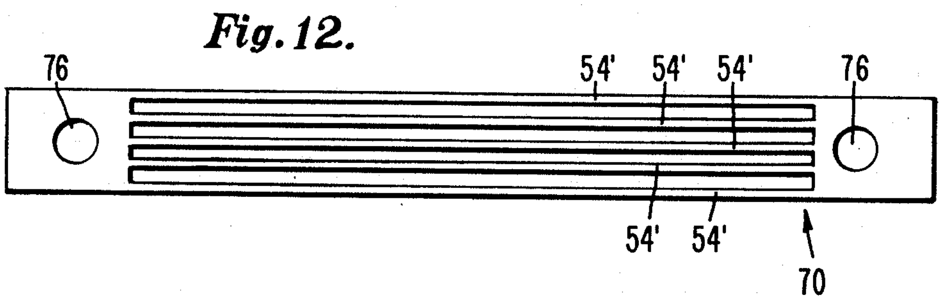
FIG. 12 is another grid used in the fabrication of the circuit structure.
Figure 14:
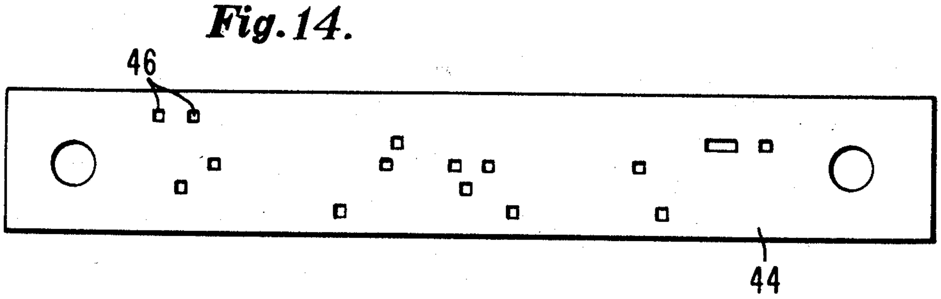
Figure 15:
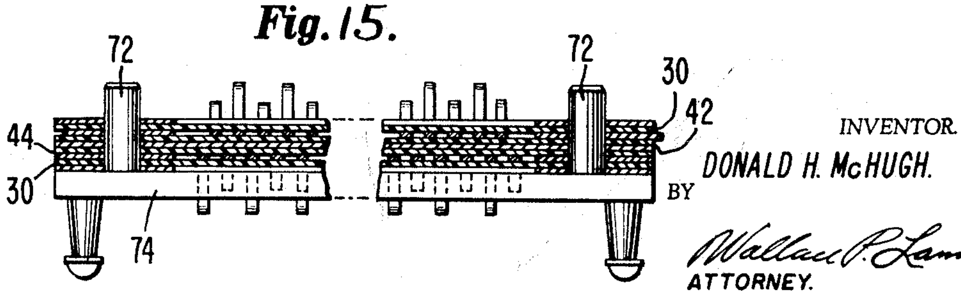
FIG. 15 is a detail sectional view illustrating a stage of fabrication of the circuit structure.

In the final assembly of the fabricated circuit structure, the two sub-assemblies 20, 22, an intermediate grid 70, and the two like insulation sheets 42, 44 are stacked on the posts 72, FIG. 15, of a suitable aligning and holding fixture 74. The intermediate grid 70, as shown in FIG. 12 is similar to the grids 52 of the sub-assemblies 20, 22, but differs therefrom in having one less web 54′ than grids 52 and with the fixture holes, as at 76, arranged such that the webs 54′ are in staggered relation to the webs 56. With the grid 70 between the two insulation sheets 42, 44 and the insulation sheets separating the grid 70 from the sub-assemblies 20, 22, suitable clamps (not shown) are provided to hold the parts together. Next, gang welding electrodes arranged to extend through the pattern of shaded holes 34 are used to weld certain ones of the transverse rows of conductor elements 64 of both grids to the webs 54′ of the grid 70. The next step of the method is to trim off the opposite end portions of all of the grids. The electronic components 40 are then mounted on the structure with their opposite leads on the reinforcing flanges 38 to which they are resistance welded. Finally, the completely assembled structure is potted with a suitable plastic material except end portions of the leads 48 which are left exposed to function as plugs for plugging into the circuit board 50.

While I have shown and described my circuit structure in considerable detail, it will be understood that many changes and variations thereof may be made without departing from the spirit and scope of the invention.

I claim:

1. A fabricated mounting and circuit structure for electronic components comprising a pair of channel structures each including a plurality of laterally positioned longitudinal rows of conductor members, a plurality of rows of cross conductor members forming a matrix with the conductor members of said first-mentioned plurality of rows of conductor members, a sheet of dielectric material interposed between said pluralities of conductor members and having access holes to align respectively with certain ones of the conductor member cross points of the matrix, means structurally and electrically connecting together the conductor members of the first-mentioned and second-mentioned rows of conductor members only where the cross points align with the holes, said matrix and dielectric sheet forming the web of the channel structure, opposite end portions of the cross members extending transverse to said web to form the sides of the channel structure and circuit terminals, said pair of channel structures arranged back to back with the webs in broadside relationship to each other, a plurality of laterally spaced conducting webs interposed between the webs of said channel structures in parallel and staggered relation to said longitudinal rows of conductor members, and means electrically and structurally connecting said plurality of webs respectively to conductor members of said cross rows of conductor members.

2. A fabricated mounting and circuit structure for electronic components comprising a pair of channel structures each including a first plurality of laterally positioned longitudinal rows of spaced apart conductor members, a second plurality of laterally positioned cross rows of conductor members forming a matrix with said first plurality of rows of conductor members, a sheet of dielectric material between said first and second pluralities of conductor members and having a pattern of access holes therethrough registering with certain ones respectively of the cross points of the first and second pluralities of conductor members, means connecting the conductors of said first and second pluralities together electrically and structurally at the said cross points in alignment with the holes in said sheet of dielectric material, said first and second pluralities of contact members and said sheet of dielectric material forming the web of a channel structure, opposite end portions of said cross conductor members extending parallel to each other and transverse to said web to form the sides of said channel and terminal mountings for electronic components, said pair of channel structures arranged in back-to-back relation with the cross rows of one of said structures in offset relation to the cross rows of the other of said structures, a plurality of laterally spaced apart longitudinal busses parallel and in staggered relation to said first conductor members, a pair of sheets of dielectric material respectively between said web members and said structures, said dielectric sheets having aligning holes, and means connecting said web members structurally and electrically through said aligning holes to certain ones of said cross rows of conductor members.

References Cited by the Examiner

UNITED STATES PATENTS

| | | | |
|---|---|---|---|
| 782,391 | 2/05 | Hanson | 174—117 X |
| 2,019,625 | 6/51 | O'Brien | 174—72 X |

| | | | |
|---|---|---|---|
| 2,558,008 | 6/51 | Smith | 174—72 |
| 2,977,672 | 4/61 | Telfer | 174—68.5 |

OTHER REFERENCES

Mattox: "Machine Produces Matrices for Modules," Electronics, vol. 34, No. 26, June 30, 1961, pp. 108, 110, 111.

E. JAMES SAX, *Primary Examiner.*

JOHN P. WILDMAN, *Examiner.*